United States Patent
Jahanghir et al.

(10) Patent No.: US 6,275,616 B1
(45) Date of Patent: Aug. 14, 2001

(54) METHOD AND APPARATUS FOR CONVERTING A HIGH DEFINITION IMAGE TO A RELATIVELY LOWER DEFINITION IMAGE USING WAVELET TRANSFORMS

(75) Inventors: Musa Jahanghir, Hayward; Jack Chaney; Michael A. Kaufman, both of San Jose, all of CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/002,256

(22) Filed: Dec. 31, 1997

Related U.S. Application Data

(60) Provisional application No. 60/058,697, filed on Sep. 12, 1997.

(51) Int. Cl.[7] .............................. G06K 9/32; G06K 9/36; G06K 9/46; H04N 7/01; H04N 7/12
(52) U.S. Cl. ...................... 382/233; 382/248; 382/250; 382/298; 382/232; 348/390.1; 348/395.1
(58) Field of Search ...................... 382/240, 248, 382/239, 232, 298, 299, 226; 348/411, 413, 441, 443, 448, 384.1, 390.1, 426, 395.1; 341/79; 375/240.3

(56) References Cited

U.S. PATENT DOCUMENTS

| | | | |
|---|---|---|---|
| 5,049,992 | * | 9/1991 | Citta et al. ........................ 348/443 |
| 5,289,277 | * | 2/1994 | Bianchard et al. ................. 348/441 |
| 5,446,498 | * | 8/1995 | Boon .................................. 348/448 |
| 5,485,279 | * | 1/1996 | Yonemitsu et al. ................ 348/411 |
| 5,504,530 | * | 4/1996 | Obikane et al. .................... 348/413 |
| 5,675,669 | * | 10/1997 | Kim ................................... 382/241 |
| 5,802,369 | * | 9/1998 | Ganesh et al. ...................... 382/248 |
| 5,828,788 | * | 10/1998 | Chiang et al. ...................... 382/240 |
| 5,835,151 | * | 11/1998 | Sun et al. ........................... 348/441 |
| 5,926,573 | * | 7/1999 | Kim et al. .......................... 382/239 |

OTHER PUBLICATIONS

Arpenti et al "Source Coding and Transmission of HDTV Images Compressed with the Wavelet Transform", IEEE, pp. 46–58, Jan. 1993.*

* cited by examiner

*Primary Examiner*—Leo Boudreau
*Assistant Examiner*—Daniel G. Mariam
(74) *Attorney, Agent, or Firm*—Kenneth L. Sherman, Esq; Sherman & Sherman; Jeffrey P. Aiello

(57) ABSTRACT

A method and an apparatus for converting a high definition image to a relatively lower definition image is provided. Image data encoded with a discrete cosine transform (DCT) is decoded using an inverse wavelet transform (IDWT). A fast inverse discrete wavelet transform (FIDWT) is also provided that reduces the number of multiplication operations relative to the IDWT. Image data is also encoded using a discrete wavelet transform (DWT) and then decoded using an (IDWT).

3 Claims, 6 Drawing Sheets

METHOD AND APPARATUS FOR CONVERTING A HIGH DEFINITION IMAGE TO A RELATIVELY LOWER DEFINITION IMAGE USING WAVELET TRANSFORMS

RELATED APPLICATION

This patent application claims priority from provisional patent application Ser. No. 60/058,697, filed on Sep. 12, 1997, entitled "Methods and Arrangements For Converting A High Definition Image To A Lower Definition Image Using Wavelet Transforms," which is incorporated herein in its entirety by reference.

FIELD OF THE INVENTION

The invention relates to multimedia images and digital communications, and more particularly to a method and apparatus for converting a high definition image to a relatively lower definition image using wavelet transforms.

BACKGROUND OF THE INVENTION

The introduction of high definition television (HDTV) has generated a large amount of publicity because of the superior performance characteristics of HDTV relative to standard definition television (SDTV). HDTV offers approximately twice the veritical and horizontal resolution of standard definition television (SDTV), providing picture quality approaching that of 35 mm film. Since HDTV signals are digital and virtually free of noise, HDTV offers sound quality approaching that of a compact disc (CD) and does not suffer from some of the shortcomings of SDTV such as crosscolor and crosslumina. HDTV also has lower transmission costs because of error correction codes currently only available with digital formats. In addition, HDTV provides multicasting, which enables broadcasters to split programming transmission into multiple channels, and a higher level of interactivity than SDTV, allowing end users to manipulate a television program at the point of reception.

Despite the technical advantages that HDTV provides over SDTV, the widespread implementation and acceptance of HDTV as a new standard depends upon the resolution of several important issues. One of the most important issues is how to implement HDTV while continuing to support the large number of existing SDTV display devices already in use. Most SDTV display devices cannot decode an HDTV signal and cannot be used in a pure HDTV broadcast environment. Moreover, the relatively high cost of HDTV display devices makes replacing existing SDTV display devices with HDTV display devices impractical. Thus, a widespread implementation of HDTV must address the problem of how to support the existing SDTV display devices currently in use.

One solution to this problem is for service providers to transmit programs in both HDTV and SDTV formats (simulcast). This could be done by transmitting both an HDTV signal and an SDTV signal, or by augmenting an SDTV signal with additional information necessary to "enhance" the SDTV signal to provide a HDTV signal. With this approach, SDTV display devices only process the SDTV portion of the signal while ignoring the additional information. On the other hand, HDTV display devices process both the SDTV signal information and the additional information. Although this approach solves the problem of how to implement HDTV while supporting existing SDTV display devices, it consumes a considerable portion of the available distribution bandwidth making it very undesirable to service providers.

An alternative solution is for service providers to transmit programs in HDTV format only and for all display units to incorporate a special decoder, sometimes referred to as an "all format decoder," that has the ability to decode both standard definition (SD) and high definition (HD) video from the HDTV signal. This approach is attractive from several standpoints. First, an all format decoder can be included in all new HDTV display devices. In addition, an all format decoder can be sold separately as a stand-alone unit that can be attached to existing SDTV display devices. This allows new HDTV display devices can take full advantage of the new HDTV technology while allowing existing SDTV display devices to continue to be used.

Conventional all-format decoders consist of an SDTV decoder, e.g. an MPEG-2 decoder, with a number of enhancements. An HDTV signal is first preprocessed to discard or decimate information that is not needed for a standard definition display, such as high-frequency coefficients. This reduces the amount of data in the preprocessed HDTV signal, reducing the required bandwidth and allowing a smaller channel buffer to be used. The reduced amount of data also simplifies subsequent processing of the preprocessed signal.

Next, the remaining portions of the encoded image data are decoded using any of the well known video sampling techniques such as a high definition 4:4:4 video sampling technique, or a lower definition video sampling technique such as 4:2:2 or 4:2:0. Conventional MPEG decoders use an inverse discrete cosine transform (IDCT) process to decode video-related data that was previously encoded using a discrete cosine transform (DUCT) process. *Digital Video: An Introduction To MPEG-2* by Barry G. Haskell, Atul Puri and Arun N. Netravali, provides useful background information on decoding video-related data and is incorporated by reference herein in its entirety.

Image data encoded and decoded by conventional encoders and decoders typically includes luminance data ($Y_C$) and two types of chrominance data referred to as ($U_C$) and ($V_C$). To display a high definition image (1920 by 1080 pixels), a typical decoder provides 1920 by 1080 pixels of luminance-related data and 960 by 540 pixels of chrominance-related data. The resulting data provides a 4:2:0 image having 1920 by 1080 pixels.

Following the decoding process, the decoded image data is then filtered and/or decimated to further reduce the image for display on a lower resolution display. By way of example, the lower definition image provided by certain decoders is ¼ the size (¼ number of pixels) of the original higher definition image. Thus, for a 1920 by 1080 pixel image (2,073,600 total pixels), the lower definition image is 960 by 540 pixels (518,400 pixels). Thus, a lower definition image has less information than a higher definition image.

Consider the conventional system 100 illustrated in FIG. 1 for encoding, transmitting and decoding image data. An image is scanned or otherwise processed to create image data 102, which is typically in the form of an image file. Image data 102 is provided to an encoder 104. Encoder 104 encodes image data 102 and provides encoded image data The encoded image data is transmitted to a decoder 106 via a link 108. Link 108 can include one or more communication mediums and/or systems and supporting apparatuses that are configured to carry the encoded image data between encoder 104 and decoder 106. Examples of link 108 include, but are not limited to, a telephone system, a cable television system, a broadcast television system (direct or indirect), a satellite broadcast system (direct or indirect), one or more computer networks and/or buses, the Internet, an intranet, and any software, hardware and other communication systems and equipment associated therewith for transmitting encoded data between two locations.

Decoder 106 decodes the encoded image data received from encoder 104 and provides decoded image data 110 that is suitable for reproduction with a display 112. Ideally, decoded image data 110 is identical to image data 102. However, limitations in the encoding and decoding processes performed by encoder 104 and decoder 106 respectively, sometimes alter the data, adversely affecting the quality of decoded image data 110 when displayed on display 112.

In certain embodiments, encoder 104 and/or decoder 106 include one or more processors that each are coupled to a memory. The processor(s) respond to computer implemented instructions stored within the memories to encode or decode image data 102 as required. In other embodiments, encoder 104 and/or decoder 106 include logic that is configured to encode or decode image data 102 as required.

FIG. 2A is a block diagram depicting a conventional system 200 for reducing a high definition image to a lower definition image. Image data 202 is provided to an encoder 204 that encodes image data 202 and provides encoded image data. Encoder 204 includes a DCT process 206 that encodes image data 202 using a DCT.

The encoded image data provided by encoder 204 is transmitted to a decoder 208 via a link 210. Link 210 communicatively couples encoder 204 and decoder 208 and provides for the transmission of data between encoder 204 and decoder 208 as previously described in regard to link 108 of FIG. 1.

Decoder 208 includes a pre-parser process 212, an IDCT process 214 and a post filter process 216. Pre-parser process 212 decimates, filters, masks, and/or otherwise reduces the amount of encoded image data from encoder 204 and provides a subset of the encoded image data to IDCT process 214. IDCT process 214 decodes the subset of the encoded image data and provides a decoded subset of the encoded image data to post filter process 216.

Post filter process 216 further processes and configures the decoded subset of the encoded image data, typically by decimating, filtering and/or otherwise down-sampling the decoded subset of the encoded image data and provides reduced image data 218. Reduced image data 218 represents a lower definition image than the image represented by decoded image data 110 (FIG. 1) and is suitable for display on a lower resolution display.

FIG. 2B depicts example matrix operations 220 associated with a conventional DCT/IDCT process. Matrix D is an 8 by 8 matrix (e.g., a macroblock) of image data that is multiplied by the 8 by 8 DCT/IDCT coefficient matrixes C and $C^T$ to produce an 8 by 8 matrix T of image data. The coefficients applied in the matrices of FIG. 2B are based upon a conventional DCT such as:

$$F(u, v) = \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N}$$

with:

u, v, x, y=0, 1, 2, . . . N–1 where:

x, y are spatial coordinates in the sample domain and u, v are coordinates in the transform domain $$C(u), C(v) = \begin{cases} \frac{1}{\sqrt{2}} \text{ for } u, v = 0; \text{ otherwise } 1 \end{cases}$$

and a conventional IDCT such as:

$$f(x, y) = \frac{2}{N} \sum_{u=0}^{N-1} \sum_{v=0}^{N-1} C(u)C(v)F(u, v)\cos\frac{(2x+1)u\pi}{2N} \cos\frac{(2y+1)v\pi}{2N}$$

This conventional DCT and conventional IDCT can be found in Annex A of the Revised Text for ITU-T Recommendation H.262/ISO/IEC 13818-2:1995, *Information Technology—Generic Coding of Moving Pictures and Associated Audio Information*, which is incorporated herein in its entirety.

Table 1 of this application contains an example computer program that implements the conventional IDCT above. Section T100 of Table 1 and Section T200 of Table 2 illustrate mathematical steps that implement the IDCT. Sections T202 and T204 of Table 2 illustrate coefficients used with the aforementioned DCT and IDCT respectively.

Although the all-format encoder approach has significant advantages over other approaches for implementing HDTV, the conventional approaches for converting an HDTV image to a lower definition image suitable for display on an SDTV display device have some significant limitations. Specifically, conventional approaches cause video-related information to be lost both before and after the IDCT process adversely affecting the symmetry of the resulting decoded image, providing a lower quality image.

Based on the need to convert high definition images to relatively lower definition images and the limitations in the prior approaches, an approach for converting high definition images to relatively lower definition images that avoids the problems associated with the prior approaches is highly desirable.

SUMMARY OF THE INVENTION

High definition images are converted to relatively lower definition images using wavelet transforms. According to one aspect of the invention, a method is provided for converting image data that has been encoded using a discrete cosine transform to provide converted image data having a relatively lower definition than the image data. The method includes the steps of receiving image data that has been encoded using a discrete cosine transform and decoding the image data with an inverse discrete wavelet transform (IDWT) to cause converted image data to be generated, wherein the converted image data has a relatively lower definition than the image data.

According to another aspect of the invention, a system is provided for converting image data that has been encoded using a discrete cosine transform to provide converted image data having a relatively lower definition than the image data. The system comprises a receiver and a decoder. The receiver receives image data that has been encoded using a discrete cosine transform. The decoder has an IDWT process configured to decode the image data and cause converted image data to be generated, wherein the converted image data has a relatively lower definition than the image data.

According to another aspect of the invention, a method is provided for encoding and decoding image data. The method includes the steps of encoding image data using a discrete wavelet transform (DWT) to provide DWT encoded image data and decoding the DWT encoded image data using an IDWT to provide IDWT decoded image data.

BRIEF DESCRIPTION OF THE DRAWINGS

Embodiments of the invention are illustrated by way of example, and not by way of limitation, in the figures of the accompanying drawings and in which like reference numerals refer to similar elements and in which.

Figure 1:
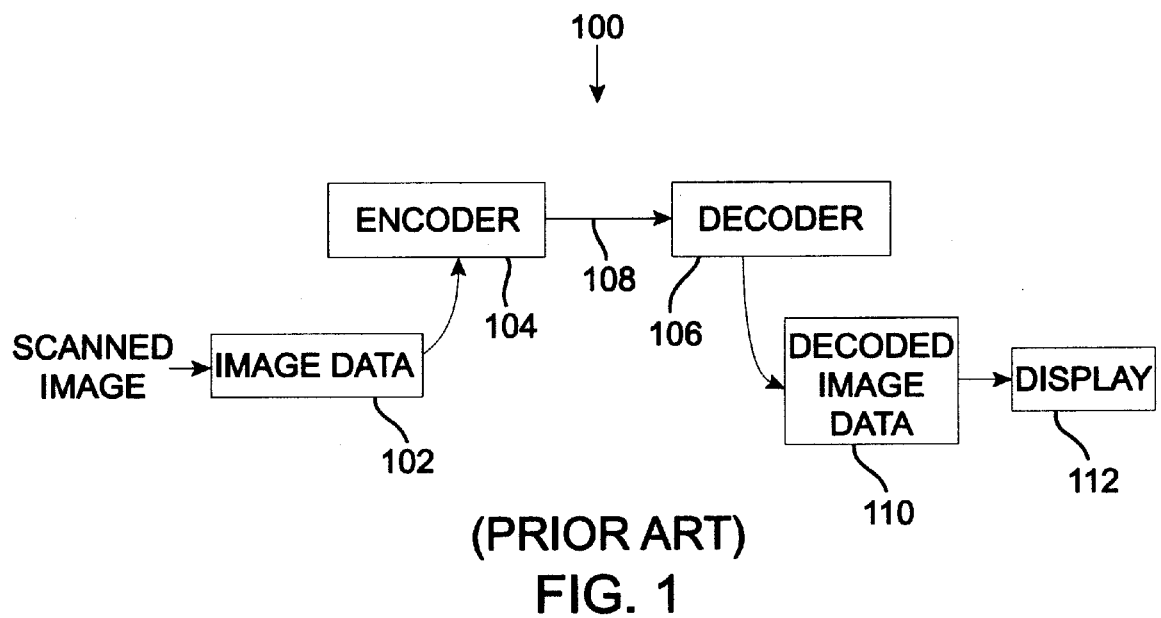
FIG. 1 is a block diagram depicting a conventional system for encoding, transmitting and decoding image data.
Figure 2A:
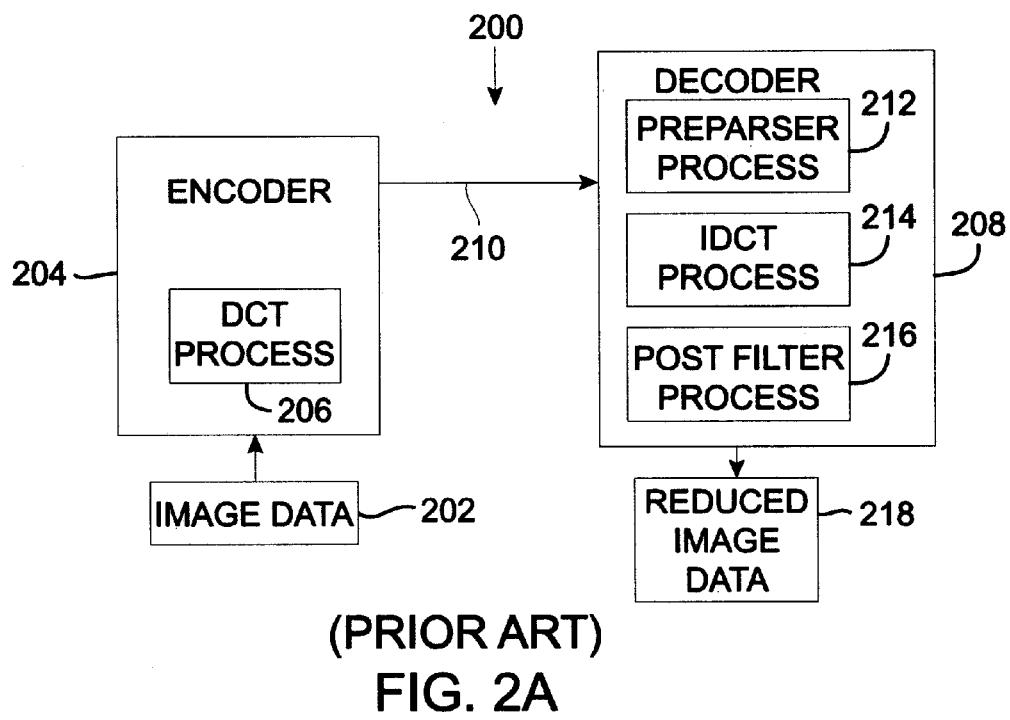
FIG. 2A is a block diagram of a conventional system for reducing a high definition image to a lower definition image.
Figure 2B:
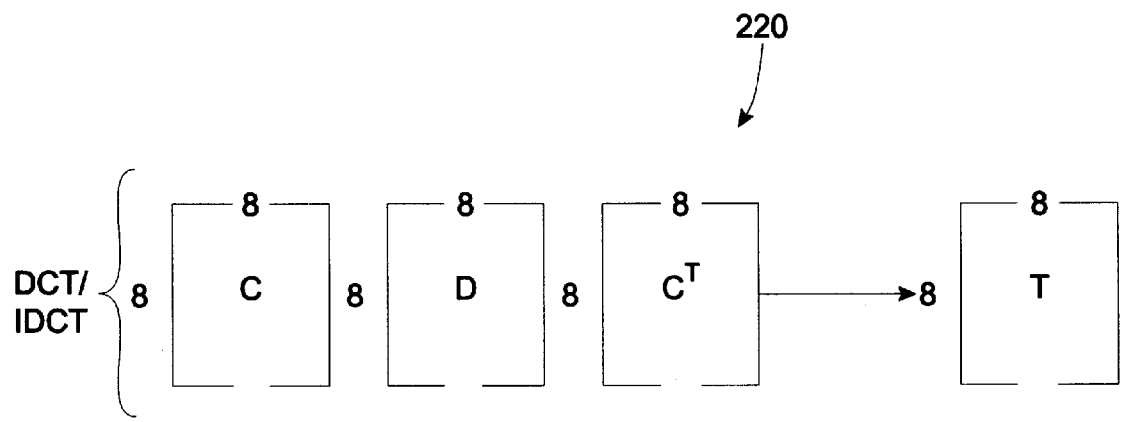
FIG. 2B depicts example matrix operations associated with a conventional DCT/IDCT process.

Table 1 contains a computer program for implementing a conventional IDCT;

Table 2 illustrates a formula and coefficients for implementing a conventional IDCT and an IDWT according to an embodiment of the invention; and Table 3 contains a computer program for implementing a fast IDWT according to an embodiment of the invention.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Functional Overview

In general, high definition images are converted to relatively lower definition images using discrete wavelet transforms or "wavelets." Wavelets are well known mathematical functions that divide data into different frequency and spatial components and then analyze each frequency and space component with a resolution matched to its scale. Wavelets provide advantages over traditional Fourier methods for analyzing physical situations, particularly where a signal contains discontinuities and sharp spikes. A useful reference on the subject of wavelets is *Wavelets and Filter Banks*, authored by Gilbert Strang and Truong Nguyen, Wellesley-Cambridge Press, the entire contents of which are incorporated herein by reference.

In the context of converting a high definition image to a relatively lower definition image, the use of an inverse discrete wavelet transform (IDWT) to decode and decimate a high definition image to provide a relatively lower definition image has been found to provide a more symmetrical lower definition image using fewer system resources than can be achieved using conventional IDCT techniques.

Processing Image Data Using IDWTs

According to an embodiment of the invention, the decoding and decimation of DCT encoded image data is performed using an IDWT process. The image data that is decoded by an IDWT configured decoder can be displayed on a lower resolution display as a 4:2:0 video image. This 4:2:0 video image is symmetrical because the received encoded image data is not pre-parsed or otherwise filtered prior to being decoded by the IDWT process. Instead, all of the received encoded image data is processed using the IDWT. The IDWT process, as applied to the received encoded image data, inherently decimates or down-samples the amount of video data. The IDWT takes advantage of the reducing capability of one or more wavelet transforms, for example, as applied to discrete blocks of received encoded video data, through the coefficients of the IDWT. Thus, decoding DCT encoded image data using an IDWT provides a higher quality lower definition image that more accurately represents the original image data. In addition, the decoding process can be performed much faster and requires fewer system resources than conventional IDCT processes.

Figure 3A:
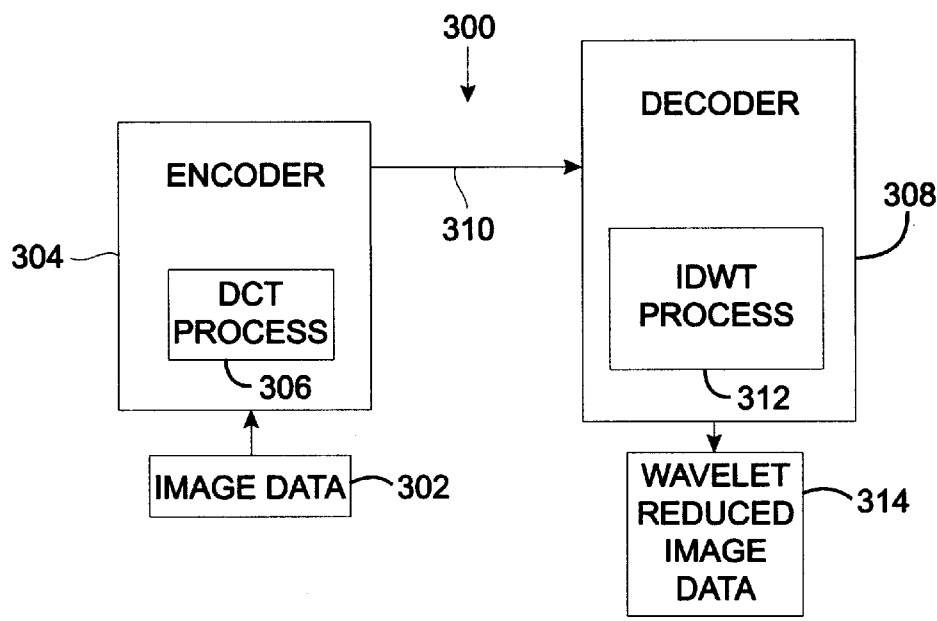
FIG. 3A is a block diagram of a system for converting a high definition image to a relatively lower definition image according to an embodiment of the invention.

FIG. 3A is a block diagram depicting a system 300 for converting a high definition image to a relatively lower definition image in accordance with an embodiment of the invention. Image data 302 is provided to an encoder 304 that encodes image data 302 and provides encoded image data. Encoder 304 includes a DCT process 306 for encoding image data 302 as previously described.

The encoded image data provided by encoder 304 is transmitted to a decoder 308 over a link 310. Encoder 304 is communicatively coupled to decoder 308 via link 310 that provides for the transmission of data between encoder 304 and decoder 308 as previously described for links 108 and 210.

Decoder 308 includes an IDWT process 312 that decodes and decimates the encoded image data received from encoder 304 via link 310 to provide wavelet reduced image data 314. Wavelet reduced image data 314 includes luminance data ($Y_W$) and two types of chrominance data ($U_W$) and ($V_W$). According to one embodiment of the invention, wavelet reduced image data 314 represents a 4:2:0 video image.

Figure 3B:
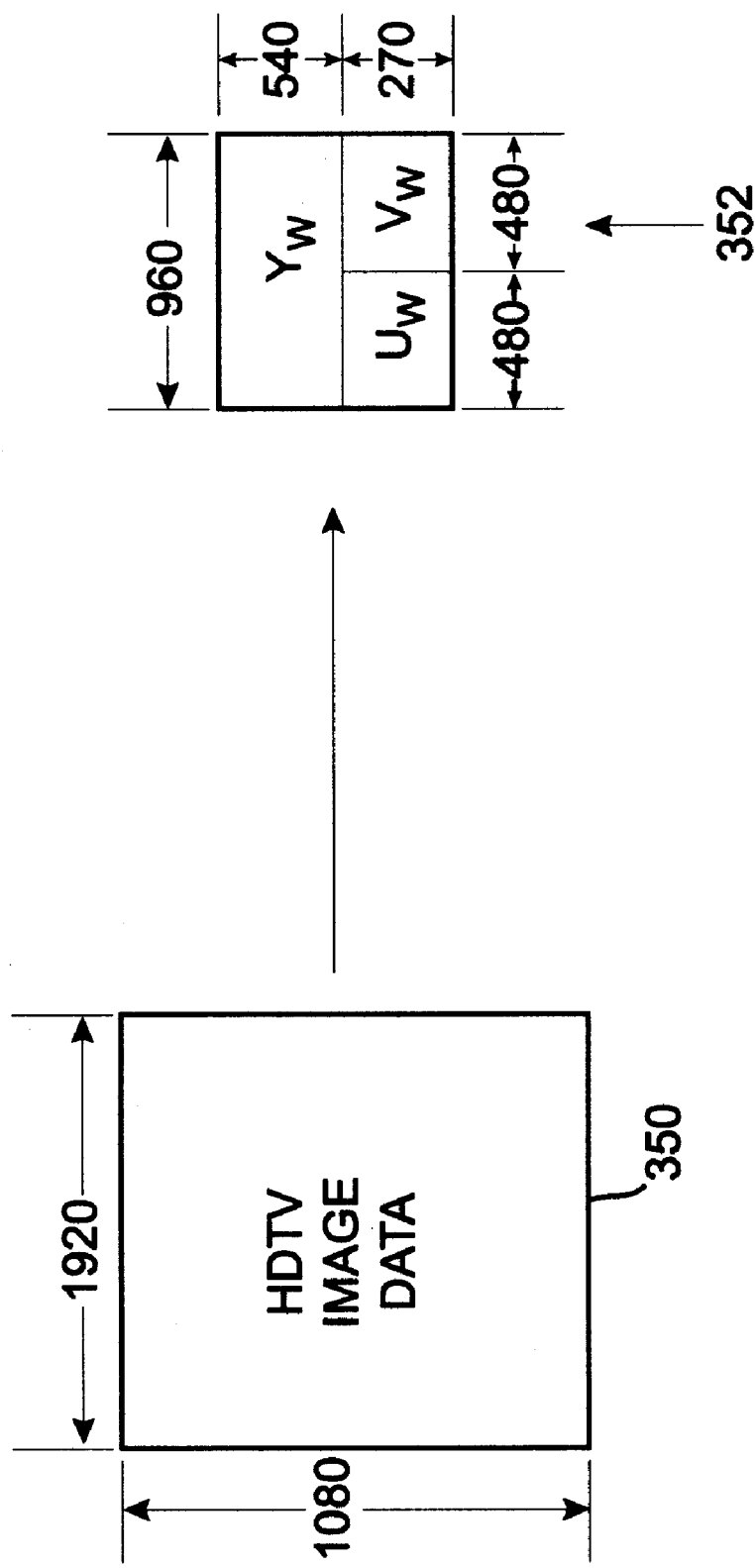
FIG. 3B illustrates the processing of HDTV image data according to an embodiment of the invention.

An example of converting HDTV image data to lower definition data according to an embodiment of the invention is depicted in FIG. 3B. HDTV image data 350, consisting of b 1920by 1080 pixels (2,073,600 pixels) of data is converted using an IDWT to provide wavelet reduced image data 352. Wavelet reduced image data 352 includes 960 by 540 pixels (518,400 pixels) of $Y_W$ data, 480 by 270 pixels (129,600 pixels) of $U_W$ data and 480 by 270 pixels (129,600 pixels) of $V_W$ data, representing 4:2:0 image.

Figure 4:
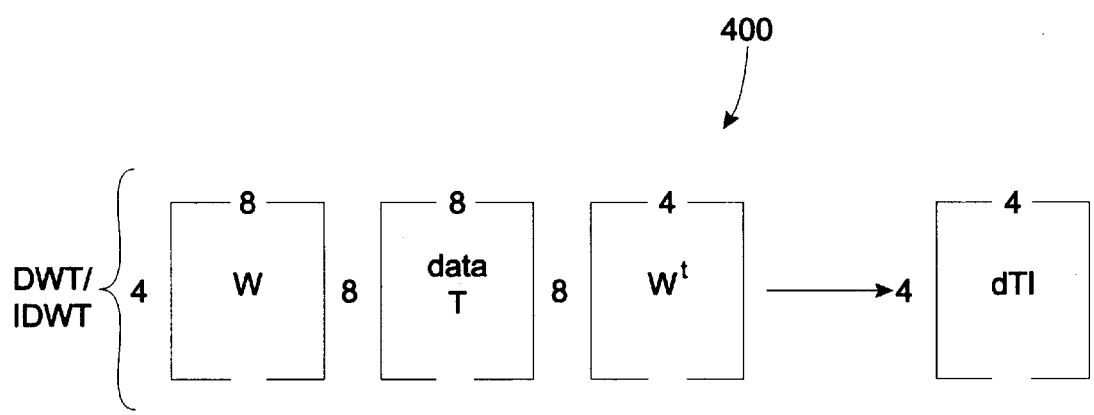
FIG. 4 illustrates matrix operations associated with an DWT/IDWT process according to an embodiment of the invention.

FIG. 4 depicts example matrix operations 400 associated with a DWT/IDWT process according to an embodiment of the invention. The data T matrix is received from encoder 304 via link 310 and multiplied by a 4 by 8 IDWT coefficient matrix W and a 8 by 4 IDWT coefficient matrix WT to produce a 4 by 4 matrix dTI. The coefficients applied in the matrices in FIG. 4 are based upon the following DWT:

$$U(x) = \frac{1}{\sqrt{2}}(idct(x) + idct(x+1)),$$

where $$idct(x) = \sqrt{\frac{2}{N}} \sum_{u=0}^{N-1} c(u) F(u) \cos\frac{(2x+1)}{2N} u\pi$$

and the following IDWT:

$$f(x) = \frac{1}{\sqrt{2}}(U(x) + 0)$$

Table 2 contains an exemplary computer program that implements an IDWT process. Sections T206 and T208 of Table 2 illustrate coefficients used with the DWT and IDWT according to an embodiment of the invention.

In accordance with certain aspects of the invention, different wavelet transforms can be used within specific systems and/or for certain types of images. The wavelet reference (Strang et al.) listed above presents several different wavelets that can used in the methods and arrangements of the invention, however additional wavelets are also known and can be adapted for use in the invention. For example, specific wavelets may be used for frame and field pictures.

Fast DWT/IDWT

A fast DWT/IDWT matrix operation is created by further reducing the number of mathematical operations required, for example, by eliminating the operations relating to the row of coefficients that equal zero (=0) in matrix W.

Figure 5:
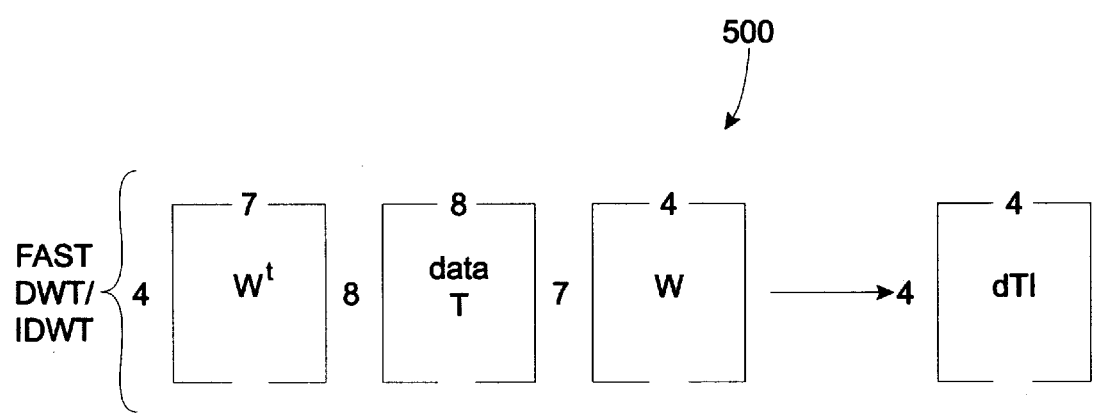
FIG. 5 illustrates matrix operations associated with a fast DWT/IDWT process according to an embodiment of the invention.

FIG. 5 depicts example matrix operations 500 associated with a fast DWT/IDWT process according to another embodiment of the invention. According to the fast DWT/IDWT process, matrix data T is received from encoder 304 via link 310 and multiplied by both a 4 by 7 fast IDWT coefficient matrix W and a 7 by 4 fast IDWT coefficient matrix $W^T$ to produce a 4 by 4 matrix dTI. The fast DWT/IDWT matrix operations can further be optimized by identifying rows, columns, and/or elements that have something in common. For example, in the first or top row of the derived matrix in section T206 all of the elements have the same value (at this resolution), and/or in the third row down from the top the elements have the same absolute magnitude however some are positive and some are negative. Those skilled in the art will recognize these and other reductions, such as replacing multiply operations with equivalent additions and subtraction operations, save additional computational time and/or reduce the number of required operations.

Table 3 includes a computer program for implementing a fast IDWT according to an embodiment of the invention. A section T300 includes a reduced set of equations for performing a fast IDWT decoding of DCT encoded image data.

Encoding Image Data Using a DWT

Figure 6:
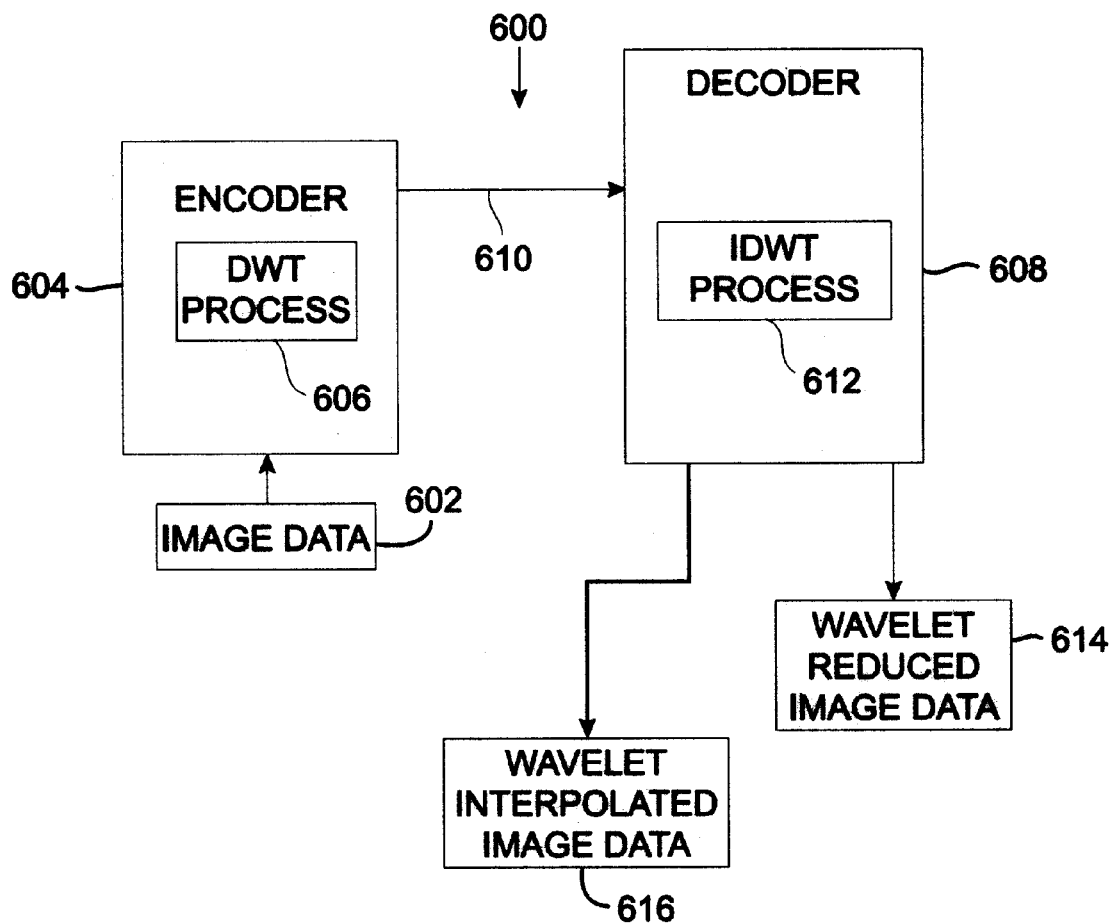
FIG. 6 is a block diagram of a system for encoding and decoding image data using a DWT/IDWT process according to an embodiment of the invention.

According to another embodiment of the invention, the DWT is used to encode image data for transmission. FIG. 6 illustrates a system 600 for encoding image data using a DWT/IDWT process according to an embodiment of the invention.

Image data 602 is provided to an encoder 604 that includes a DWT process 606 as previously described. Image data 602 is encoded by DWT process 606 and encoder 604 provides DWT encoded image data to decoder 608 via link 610.

Decoder 608 includes an IDWT process 612 as previously described. Decoder 608 decodes the DWT encoded image data from encoder 604 and provides wavelet reduced image data 614. Decoder 608 also decodes the DWT encoded image data from encoder 604 and provides wavelet interpolated image data 616. Wavelet interpolated image data 616 provides image data having a definition from SD to HD, depending upon the requirements of a particular application. For example, a particular display device may be capable of displaying an image having a higher definition than SD, up to and including HD. In this situation, a particular IDWT and interpolation is selected to provide wavelet interpolated data having a definition suited for the particular display device. A suitable IDWT for use in generating interpolated image data 616 is as follows:

$$f(x) = \frac{1}{\sqrt{2}}(U(x) + V(x))$$

$$f(x+1) = \frac{1}{\sqrt{2}}(U(x) - V(x))$$

This is similar to a conventional system, however, rather than encoding with a DCT process and decoding with an IDCT process, a DWT process and an IDWT process are used for encoding and decoding the image data. Using a wavelet based transform and optimizing the matrix operations reduces the number of operations required and the communication and/or memory requirements within the overall system. The result is that several different (high or low) definition images can be produced for different display resolutions.

DWTs and Motion Compensation

An additional benefit of the IDWT configured decoder is that, in the case of video, such as MPEG-2 images, motion compensation is accomplished on the decimated output of the IDWT process. Conventional decoders typically perform motion compensation on 16 by 16 macro blocks or matrixes of image data. An IDWT configured decoder, in accordance with one embodiment of the invention, reduces the macro blocks or matrixes of image data to ¼ the original size, that is 8 by 8. These 8 by 8 blocks of image data are then momentarily interpolated to the original size and the same motion vectors as would normally be used in the 16 by 16 blocks are applied, however with a reduced number of operations and increased speed. The reduced size of the image data also reduces the memory requirements of the decoder, such as, for example, a cache memory that supports one or more processors that are included in the decoder.

Hardware Overview

Figure 7:
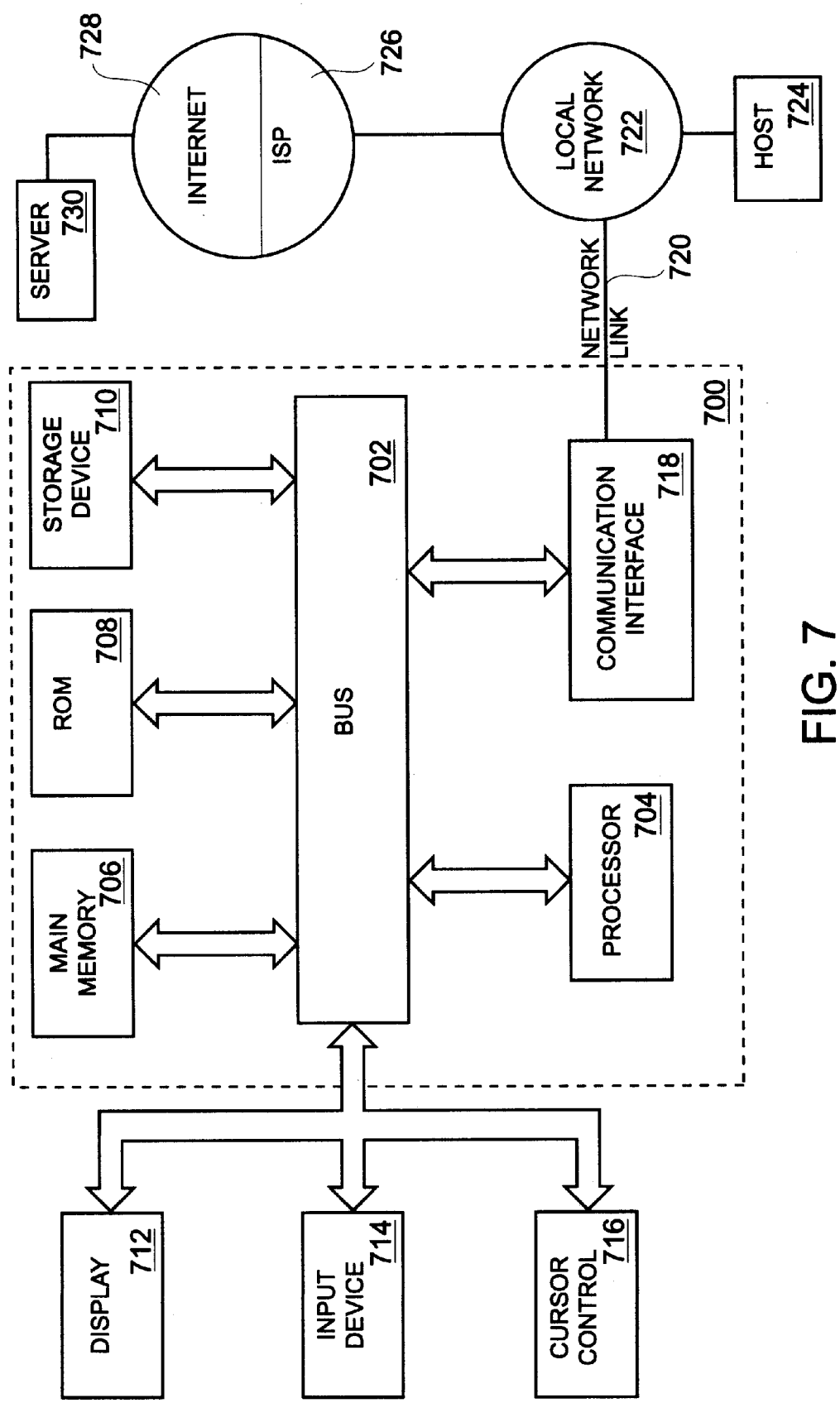
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for converting a high definition image to a relatively lower definition image using wavelet transforms. According to one embodiment of the invention, converting a high definition image to a relatively lower definition image using wavelet transforms is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for the conversion of a high definition image to a relatively lower definition image using wavelet transforms as described herein.

Communication interface 718 may be a USB/Tuner and network link 720 may be an antenna or cable for connecting computer system 700 to a cable provider, satellite provider or other terrestrial transmission system for receiving messages, data and program code from another source.

The received code may be executed by processor 704 as it is received, and/or stored in storage device 710, or other non-volatile storage for later execution. In this manner, computer system 700 may obtain application code in the form of a carrier wave.

The invention provides several advantages over prior approaches for converting a high definition image to a relatively lower definition image. First, video image data is not pre-parsed or otherwise filtered prior to being decoded by the IDWT process, resulting in a symmetrical video image. Thus, decoding DCT encoded image data using an IDWT provides a higher quality lower definition image that more accurately represents the original image data. In addition, the decoding process can be performed much faster and requires fewer system resources than conventional IDCT processes.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

TABLE 1

```
/* idct c, inverse fast discrete cosine transform                        */
/* Copyright (C) 1996, MPEG Software Simulation Group. All Rights Reserved. */
 * Disciaimer of Warranty
 *
 * These software programs are available to the user without any license fee or
 * royalty on an "as is" basis. The MPEG Software Simulation Group disclaims
 * any and all warranties, whether express, implied, or statuary, including any
 * implied warranties or merchantability or of fitness for a particular
 * purpose. In no event shall the copyright-holder be liable for any
 * incidental, punitive, or consequential damages of any kind whatsoever
 * arising from the use of these programs.
 *
 * This disclaimer of warranty extends to the user of these programs and user's
 * customers, employees, agents, transferees, successors, and assigns.
 * The MPEG Software Simulation Group does not represent or warrant that the
 * programs furnished hereunder are free of infringement of any third-party
 * patents.
 *
 * Commercial implementations of MPEG-1 and MPEG-2 video, including shareware,
 * are subject to royalty fees to patent holders. Many of these patents are
 * general enough such that they are unavoidable regardless of implementation
 * design.
 *
 */
/**********************************************************/
/* inverse two dimensional DCT, Chen-Wang algorithm         */
/* (cf. IEEE ASSP-32, pp. 803–816, Aug. 1984)               */
/* 32-bit integer arithmetic (8 bit coefficients)           */
/* 11 mults, 29 adds per DCT                                */
/*                                              sE, 18.8.91 */
/*
/* coefficients extended to 12 bit for IEEE1180–1990        */
/*    compliance                                sE, 2.1.94  */
/**********************************************************/
/* this code assumes >> to be a two's-complement arithmetic */
/* right shift: (-2) >> 1 == -1, (-3) >> 1 == -2            */
#include "config.h"
#define W1 2841 /* 2048*sqrt(2)*cos(1*pi/16)    */
#define W2 2676 /* 2048*sqrt(2)*cos(2*pi/16)    */
#define W3 2408 /* 2048*sqrt(2)*cos(3*pi/16)    */
#define W5 1609 /* 2048*sqrt(2)*cos(5*pi/16)    */
#define W6 1108 /* 2048*sqrt(2)*cos(6*pi/16)    */
#define W7 565  /* 2048*sqrt(2)*cos(7*pi/16)    */
/* global declarations */
void Initialize_Fast_IDCT _ANSI_ARGS_((void));
void Fast_IDCT ._3ANSI_ARGS_((short *block));
/* private data */
static short iclip[1024]; /* clipping table */
static short *iclp;
/* private prototypes */
static void idctrow _ANSI_ARGS_((short *blk));
static void idctcol _ANSI_ARGS_((short *blk));
/* row (horizontal) IDCT
 *
 *
 *
```

$$dst[k] = \sum_{l=0}^{7} c[l] * src[l] * \cos\left(\frac{pi}{8} * \left(k + \frac{1}{2}\right) * 1\right)$$

```
 *
 *
 * where:    c[0]    = 128
 *           c[1..7[  = 128*sqrt(2)
 */
static void idctrow(blk)
short *blk;
{
    int x0, x1, x2, x3, x4, x5, x6, x7, x8;
    /* shortcut */
    if (! (   (x1 = blk[4]<<11) | (x2 = blk[6]) | (x3 = blk[2]) |
              (x4 = blk[1]) | (x5 = blk[7]) | (x6 = blk[5]) | (x7 = blk[3])))
    {
      blk[0]=blk[1]=blk[2]=blk[3]=blk[4]=blk[5]=blk[6]=blk[7]=blk[0]<<3;
      return;
    }
    x0 = (blk[0]<<11) + 128; /* for proper rounding in the fourth stage */
```

TABLE 1-continued

```
        /* first stage */
        x8 = W7 * (x4 + x5);
        x4 = x8 + (W1 − W7) * x4;
        x5 = x8 − (W1 + W7) * x5;
        x8 = W3 * (x6 + x7);
        x6 = x8 − (W3 − W5) * x6;
        x7 = x8 − (W3 + W5) * x7;
        /* second stage */
        x8 = x0 + x1;
        x0 −= x1;
        x1 = W6 * (x3 + x2);
        x2 = x1 − (W2 + W6) * x2;
        x3 = x1 + (W2 − W6) * x3;
        x1 = x4 + x6;
        x4 −= x6;
        x6 = x5 + x7;
        x5 −= x7;                                      T100
        /* third stage */
        x7 = x8 + x3;
        x8 −= x3;
        x3 − x0 + x2;
        x0 −= x2;
        x2 = (181 * (x4 + x5) + 128) >> 8;
        x4 = (181 * (x4 − x5) + 128) >> 8;
        /* fourth stage */
        blk[0] = (x7 + x1) >> 8;
        blk[1] = (x3 + x2) >> 8;
        blk[2] = (x0 + x4) >> 8;
        blk[3] = (x8 + x6) >> 8;
        blk[4] = (x8 + x6) >> 8;
        blk[5] = (x0 + x4) >> 8;
        blk[6] = (x3 + x2) >> 8;
        blk[7] = (x7 + x1) >> 8;

/* column (vertical) IDCT
 *
 *
 *
```

$$dst[8*k] = \sum_{1=0}^{7} c[1] * src[8*1] * \cos\left(\frac{pi}{8} * \left(k + \frac{1}{2}\right) * 1\right)$$

```
 *
 *
 * where:    c[0]     = 1/1024
 *           c[1..7[  = (1/1024)*sqrt(2)
 */
static void idctcol(blk)
short *blk;
{
    int x0, x1, x2, x3, x4, x5, x6, x7, x8;
    /* shortcut */
    if (!(    (x1 = (blk[8*4]<<8)) | (x2 = blk[8*6]) | (x3 = blk[8*2]) |
              (x4 = blk[8*1]) | (x5 = blk[8*7 ) | (x6 = blk[8*5]) | (x7 = blk[8*3])))
    {
      blk[8*0]=blk[8*1]=blk[8*2]=blk[8*3]=blk[8*4]=blk[8*5]=blk[8*6]=blk[8*7]=
         iclp[(blk[8*0]+32)>>6];
      return;
    }
    x0 = (blk[8*0]<<8) + 8192;
    /* first stage */
    x8 = W7*(x4 + x5) + 4;
    x4 = (x8+(W1−W7)*x4)>>3;
    x5 = (x8−(W1+W7)*x5)>>3;
```

TABLE 1-continued

```
    x8 = W3*(x6+x7) + 4;
    x6 = (x8-(W3+W5)*x6)>>3;
    x7 = (x8-(W3+W5)*x7)>>3;
    /* second stage */
    x8 = x0 + x1;
    x0 -= x1;
    x1 = W6*(x3+x2) + 4;
    x2 = (x1+(W2-W6)*x2)>>3;
    x3 = (x1+(W2-W6)*x3)>>3;
    x1 = x4 + x6;
    x4 -= x6;
    x6 = x5 + x7;
    x5 -= x7;
    /* third stage */
    x7 = x8 + x3;
    x8 -= x3;
    x3 = x0 + x2;
    x0 -= x2;
    x2 = (181*(x4+x5)+128)>>8;
    x4 = (181*(x4-x5)+128)>>8;
    /* fourth stage */
    blk[8*0] = iclp[(x7+x1)>>14];
    blk[8*1] = iclp[(x3+x2)>>14];
    blk[8*2] = iclp[(x0+x4)>>14];
    blk[8*3] = iclp[(x8+x6)>>14];
    blk[8*4] = iclp[(x8-x6)>>14];
    blk[8*5] = iclp[(x0-x4)>>14];
    blk[8*6] = iclp[(x3-x2)>>14];
    blk[8*7] = iclp[(x7-x1)>>14];
{
/* two dimensional inverse discrete cosine transform */
void Fast_IDCT(block)
short *block;
{
    int i;
    for (i=0; i<8; i++)
        idctrow(block+8*i);
    for (i=0; i<8; i++)
        idctcol (block+i);
}
void Initialize_Fast_IDCT()
{
    int i;
    iclp = iclip+512;
    for (i= -512; i<512; i++)
        iclp[i] = (i<-256) ? -256 : ((i>255) ? 255 : i);
}
```

<<LinearAlgebra`MatrixManipulation`
ClearAll[];     L = 8;

$$dct = Table\left[\sqrt{\frac{2}{L}} \cos\left[\pi k\left(n + \frac{1}{2}\right)\bigg/L\right], (k, 0, L-1), (n, 0, L-1)\right]; \quad T200$$
$$dct[[1]] = dct[[1]]\big/\sqrt{2} \, ;$$

MatrixForm[Simplify[Simplify[dct]]]
MatrixForm[Simplify[N[dct, 8]]]
data = Table[$d_{i,j}$, {i, L}, {j, L}];

$$dwt = Table\left[\frac{1}{\sqrt{2L}}\left(\cos\left[\pi k\left(n - \frac{1}{2}\right)\bigg/L\right] + \cos\left[\pi k\left(n + \frac{1}{2}\right)\bigg/L\right]\right), (k, 0, L-1), (n, 1, L, 2)\right];$$
$$dwt[[1]] = dwt[[1]]\big/\sqrt{2} \, ;$$

(* MatrixForm[Simplify[dwt]] *)
MatrixForm[simplify[N[dwt, 8]]]
Matrixform[BaseForm[Simplify[N[dwt, 8]], 16]]     (* <- *)
dataT=dct data.Transpose[dct];
Chop[N[dataT,2], .001]
dataTI=Transpose[dwt] dataT dwt;

-continued

MatrixForm[Chop;8 Simplify[N[dataTI,2]], .002]] *)

$$\begin{pmatrix} \frac{1}{2\sqrt{2}} & \frac{1}{2\sqrt{2}} & \frac{1}{2\sqrt{2}} & \frac{1}{2\sqrt{2}} & \frac{1}{2\sqrt{2}} & \frac{1}{2\sqrt{2}} & \frac{1}{2\sqrt{2}} & \frac{1}{2\sqrt{2}} \\ \frac{1}{2}\text{Cos}\left[\frac{\pi}{16}\right] & \frac{1}{2}\text{Cos}\left[\frac{3\pi}{16}\right] & \frac{1}{2}\text{Cos}\left[\frac{5\pi}{16}\right] & \frac{1}{2}\text{Cos}\left[\frac{7\pi}{16}\right] & \frac{1}{2}\text{Cos}\left[\frac{9\pi}{16}\right] & \frac{1}{2}\text{Cos}\left[\frac{11\pi}{16}\right] & \frac{1}{2}\text{Cos}\left[\frac{13\pi}{16}\right] & \frac{1}{2}\text{Cos}\left[\frac{15\pi}{16}\right] \\ \frac{1}{2}\text{Cos}\left[\frac{\pi}{8}\right] & \frac{1}{2}\text{Cos}\left[\frac{3\pi}{8}\right] & \frac{1}{2}\text{Cos}\left[\frac{5\pi}{8}\right] & \frac{1}{2}\text{Cos}\left[\frac{7\pi}{8}\right] & \frac{1}{2}\text{Cos}\left[\frac{9\pi}{8}\right] & \frac{1}{2}\text{Cos}\left[\frac{11\pi}{8}\right] & \frac{1}{2}\text{Cos}\left[\frac{13\pi}{8}\right] & \frac{1}{2}\text{Cos}\left[\frac{15\pi}{8}\right] \\ \frac{1}{2}\text{Cos}\left[\frac{3\pi}{16}\right] & \frac{1}{2}\text{Cos}\left[\frac{9\pi}{16}\right] & \frac{1}{2}\text{Cos}\left[\frac{15\pi}{16}\right] & \frac{1}{2}\text{Cos}\left[\frac{21\pi}{16}\right] & \frac{1}{2}\text{Cos}\left[\frac{27\pi}{16}\right] & \frac{1}{2}\text{Cos}\left[\frac{33\pi}{16}\right] & \frac{1}{2}\text{Cos}\left[\frac{39\pi}{16}\right] & \frac{1}{2}\text{Cos}\left[\frac{45\pi}{16}\right] \\ \frac{1}{2\sqrt{2}} & -\frac{1}{2\sqrt{2}} & -\frac{1}{2\sqrt{2}} & \frac{1}{2\sqrt{2}} & \frac{1}{2\sqrt{2}} & -\frac{1}{2\sqrt{2}} & -\frac{1}{2\sqrt{2}} & \frac{1}{2\sqrt{2}} \\ \frac{1}{2}\text{Cos}\left[\frac{5\pi}{16}\right] & \frac{1}{2}\text{Cos}\left[\frac{15\pi}{16}\right] & \frac{1}{2}\text{Cos}\left[\frac{25\pi}{16}\right] & \frac{1}{2}\text{Cos}\left[\frac{35\pi}{16}\right] & \frac{1}{2}\text{Cos}\left[\frac{45\pi}{16}\right] & \frac{1}{2}\text{Cos}\left[\frac{55\pi}{16}\right] & \frac{1}{2}\text{Cos}\left[\frac{65\pi}{16}\right] & \frac{1}{2}\text{Cos}\left[\frac{75\pi}{16}\right] \\ \frac{1}{2}\text{Cos}\left[\frac{3\pi}{8}\right] & \frac{1}{2}\text{Cos}\left[\frac{9\pi}{8}\right] & \frac{1}{2}\text{Cos}\left[\frac{15\pi}{8}\right] & \frac{1}{2}\text{Cos}\left[\frac{21\pi}{8}\right] & \frac{1}{2}\text{Cos}\left[\frac{27\pi}{8}\right] & \frac{1}{2}\text{Cos}\left[\frac{33\pi}{8}\right] & \frac{1}{2}\text{Cos}\left[\frac{39\pi}{8}\right] & \frac{1}{2}\text{Cos}\left[\frac{45\pi}{8}\right] \\ \frac{1}{2}\text{Cos}\left[\frac{7\pi}{16}\right] & \frac{1}{2}\text{Cos}\left[\frac{21\pi}{16}\right] & \frac{1}{2}\text{Cos}\left[\frac{35\pi}{16}\right] & \frac{1}{2}\text{Cos}\left[\frac{49\pi}{16}\right] & \frac{1}{2}\text{Cos}\left[\frac{63\pi}{16}\right] & \frac{1}{2}\text{Cos}\left[\frac{77\pi}{16}\right] & \frac{1}{2}\text{Cos}\left[\frac{91\pi}{16}\right] & \frac{1}{2}\text{Cos}\left[\frac{105\pi}{16}\right] \end{pmatrix} \Bigg\} T202$$

$$\begin{pmatrix} 0.35355339 & 0.35355339 & 0.35355339 & 0.35355339 & 0.35355339 & 0.35355339 & 0.35355339 & 0.35355339 \\ 0.49039264 & 0.41573481 & 0.27778512 & 0.097545161 & -0.097545161 & -0.27778512 & -0.41573481 & -0.49039264 \\ 0.46193977 & 0.19134172 & -0.19134172 & -0.46193977 & -0.46193977 & -0.19134172 & 0.19134172 & 0.46193977 \\ 0.41573481 & -0.097545161 & -0.49039264 & -0.27778512 & 0.27778512 & 0.49039264 & 0.097545161 & -0.41573481 \\ 0.35355339 & -0.35355339 & -0.35355339 & 0.35355339 & 0.35355339 & -0.35355339 & -0.35355339 & 0.35355339 \\ 0.27778512 & -0.49039264 & 0.097545161 & 0.41573481 & -0.41573481 & -0.097545161 & 0.49039264 & -0.27778512 \\ 0.19134172 & -0.46193977 & 0.46193977 & -0.19134172 & -0.19134172 & 0.46193977 & -0.46193977 & 0.19134172 \\ 0.097545161 & -0.27778512 & 0.41573481 & -0.49039264 & 0.49039264 & -0.41573481 & 0.27778512 & -0.097545161 \end{pmatrix} \Bigg\} T204$$

$$\begin{pmatrix} 0.35355339 & 0.35355339 & 0.35355339 & 0.35355339 \\ 0.45306372 & 0.18766514 & -0.18766514 & -0.45306372 \\ 0.32664074 & -0.32664074 & -0.32664074 & 0.32664074 \\ 0.15909482 & -0.38408888 & 0.38408888 & -0.15909482 \\ 0 & 0 & 0 & 0 \\ -0.10630376 & 0.25663998 & -0.25663998 & 0.10630376 \\ -0.13529903 & 0.13529903 & 0.13529903 & -0.13529903 \\ -0.090119978 & -0.037328917 & 0.037328917 & 0.090119978 \end{pmatrix} \Bigg\} T206$$

$$\left. \begin{matrix} \{ \{0.5a8279a_{16}, 0.5a8279a_{16}, 0.5a8279a_{16}, 0.5a8279a_{16}\}, \{0.73fbfbf_{16}, 0.300ad29_{16}, -0.300ad29_{16}, -0.73fbfbfhd\ 16\}, \\ \{0.539eba4_{16}, -0.539eba4_{16}, -0.539eba4_{16}, 0.539eba4_{16}\}, \{0.28ba703_{16}, -0.6253a61_{16}, 0.6253a61_{16}, -0.28ba703_{16}\}, \\ \{0_{16}, O_{16}, O_{16}, O_{16}\}, \{-0.1b36b93_{16}, 0.41b3287_{16}, -0.41b3287_{16}, 0.1b36b93_{16}\}, \\ \{-0.22a2f4f_{16}, 0.22a2f4f_{16}, 0.22a2f4f_{16}, -0.22a2f4f_{16}\}, \{-0.17121a5_{16}, -0.098e634e_{16}, 098e634e_{16}, 0.17121a5_{16}\}\} \end{matrix} \right\} T208$$

w1 = dwt[[1, 1]]; w2 = dwt[[3, 1]]; w3 = dwt[[7, 1]];
w4 = dwt[[2, 1]]; w5 = dwt[[4, 1]]; w6 = dwt[[6, 1]]; w7 = dwt[(8, 1]];
w8 = dwt[[2, 2]]; w9 = dwt[[4, 2]]; w10 = dwt[[6, 2]]; w11 = dwt[[8, 2]];
x0 = w1.b0;
x1 = w2 b2 − w3 b6;
x2 = x0 + xl;
x3 = w4 b1 + wS b3 − w6 b5 − w7 b7;
x4 = w8 b1 − w9 b3 + w10 b5 − w11 b7;
x5 = x0 − x1;
out0 = x2 + x3;
out1 = x5 + x4;
out2 = x5 − x4;
out3 = x2 − x3;
bO = 1; b1 = 0; b2 = 0; b3 = 0; b4 = 0; b5 = 0; b6 = 0; b7 = 0;
N out0, 4
N out1, 4
b0 = 0; b1 = 1; b2 = 0; b3 = 0; b4 = 0; b5 = 0; b6 = 0; b7 = 0;
N[out0, 4]
N[out1, 4]
N[out2, 4]
N[out3, 4]
0.4619
0.1913
−0.1913
−0.4619
b0 = 0; b1 = 0; b2 = 1; b3 = 0; b4 = 0; b5 = 0; b6 = 0; b7 = 0;
N[out0, 4]
N[out1, 4]
N[out2, 4]
N[out3, 4]
0.3536
−0.3536
−0.3536

-continued 0.3536
b0 = 0; b1 = 0; b2 = 0; b3 = 1; b4 = 0; b5 = 0; b6 = 0; b7 = 0;
N[out0, 4]
N[out1, 4]
N[out2, 4]
N[out3, 4]
0.1913
0.4619
−0.4619
−0.1913
b0 = 0; b1 = 0; b2 = 0; b3 = 0; b4 = 1; b5 = 0; b6 = 0; b7 = 0;
N out0, 4
N out1, 4

TABLE 3

```
/**********************************************************
 *
 * Copyright 1996–1997 Samsung North America
 * All Rights Reserved.
 *
 * Samsung Information System America
 * 3655 North First Street
 * San Jose, CA 95134-1713
 *
 * File: idwt.c
 *
 * Authors: Musa Jahanghir, Jack Chaney, Michael Kaufman
 *
 * Description: Inverse discrete wavelet transformations.
 *
 * Notes:
 *
 *
 **********************************************************/
#include "math.h"
#include "config.h"
#ifndef PI
#  ifdef M_PI
#     define PI M_PI
#  else
#     define PI 3.14159265358979323846
#  endif
#endif
/***********************/
/* IDWT Coefficients follow */
/* Full precision */
/*
#define W1    0x5a8279a
#define W2    0x539eba4
#define W3    0x22a2f4f
#define W4    0x73fbfbf
#define W5    0x28ba703
#define W6    0x1b36b93
#define W7    0x17121a5
#define W8    0x300ad29
#define W9    0x6253a61
#define W10   0x41b3287
#define W11   0x098e634
*/
/* Truncated to 32 bit */
#define W1    0x5a82
#define W2    0x539f
#define W3    0x22a3
#define W4    0x73fc
#define W5    0x28ba
#define W6    0x1b37
#define W7    0x1712
#define W8    0x300b
#define W9    0x6254
#define W10   0x41b3
#define W11   0x098e
/* Rounded to 32 bit */
/*
```

TABLE 3-continued

```
#define W1    0x5a83
#define W2    0x539e
#define W3    0x22a2
#define W4    0x73fb
#define W5    0x28ba
#define W6    0x1b36
#define W7    0x1712
#define W8    0x300a
#define W9    0x6253
#define W10   0x41b3
#define W11   0x098e
*/
/* private prototypes */
static void idwtrow __ANSI_ARGS__((short *blk));
static void idwtcol __ANSI_ARGS__((short *blk));
/* private data */
/* clipping table */
static short iclip[1024];
static short *iclp;
/* cosine transform matrix for 8x1 IDWT */
static double c[8][8];
/***********************/
/* Horizontal IDWT (row)      */
/***********************/
void idwtrow(short *blk)
{
    int x0, x1, x2, x3, x4, x5;
    x0 = W1*blk[0];
    x1 = (W2*blk[2]) − (W3*blk[6]);
    x2 = x0 + x1;
    x3 = (W4*blk[1]) + (W5*blk[3]) − (W6*blk[5]) − (W7*blk[7]);
    x4 = (W8*blk[1]) − (W9*blk[3]) + (W10*blk[5]) − (W11*blk[7]);
    x5 = x0 − x1;
    blk[0] = (x2 + x3) >> 14;
    blk[1] = (x5 + x4) >> 14;
    blk[2] = (x5 − x4) >> 14;
    blk[3] = (x2 − x3) >> 14;
    blk[4] = blk[5] = blk[6] = blk[7] = 0;
}
/***********************/
/* Vertical IDWT (column)     */
/***********************/
void idwtcol (short *blk)
{
    int x0, x1, x2, x3, x4, x5;
    x0 = W1*blk[0];
    x1 = (W2*blk[16]) − (W3*blk[48]);
    x2 = x0 + x1;
    x3 = (W4*blk[8]) + (W5*blk[24]) − (W6*blk[40]) − (W7*blk[56]);
    x4 = (W8*blk[8]) − (W9*blk[24]) + (W10*blk[40]) − (W11*blk[56]);
    x5 = x0 − x1;
    blk[0] = iclp[(x2 + x3) >> 18];
    blk[8] = iclp[(x5 + x4) >> 18];
    blk[16] = iclp[(x5 − x4) >> 18];
    blk[24] = iclp[(x2 − x3) >> 18];
    blk[32] = blk[40] = blk[48] = blk[56] = 0;
}
/***********************/
/* Fast_IDWT algorithm */
```

TABLE 3-continued

```
/****************************/
void Fast_IDWT(short *block)
{
    int i,j;
    int x;
    for (i=0; i<8; i++)
        idwtrow(block+8*i);
    for (i=0; i<4; i++)
        idwtcol(block+i);
}
/********************************/
/* Initialize clipping for Fast_IDWT */
/********************************/
void Initialize_Fast_IDWT(void)
{
    int i;
    iclp = iclip+512;
    for (i= -512; i<512; i++)
        iclp[i] = (i<-256) ? -256 : ((i>255) ? 255 : i);
}
/*****************************/
/* Initialize DWT coefficient matrix */
/*****************************/
void Initialize_Reference_IDWT(void)
{
    int freq, time;
    double scale;
    for (freq=0; freq < 8; freq++)
    {
        scale = (freq == 0) ? sqrt(0.125) : 0.5;
        for (time=0; time<8; time++)
            c[freq][time] = scale*cos((PI/8.0)*freq*(time + 0.5));
    }
}
/********************************/
/* Full precision IDWT transformation */
/********************************/
void IDWT(short *block)
{
    int i, j, k, v;
    double partial_product;
    double tmp[64];
    for (i=0; i<8; i++)
        for (j=0; j<8; j+=2)
        {
            partial_product = 0.0;
            for (k=0; k<8; k++)
                partial_product += (c[k][j] + c[k][j+1])*block[8*i+k];
            tmp[8*i+j/2] = partial_product/2;
        }
    /* Transpose operation is integrated into address mapping by
       switching loop order of i and j */
    for (j=0; j<4; j++)
        for (i=0; i<4; i++)
        {
            partial_product = 0.0;
            for (k=0; k<8; k++)
                partial_product+= (c[k][i] + c[k][i+1])*tmp[8*k+j];
            v = (int) floor(partial_product/2+0.5);
            block[8*i+j] = (v<-256) ? -256 : ((v>255) ? 255 : v);
        }
}
```

What is claimed is:

1. A method for encoding and decoding image data, the method comprising the steps of:

encoding image data using a discrete wavelet transform (DWT) to provide DWT encoded image data; and decoding the DWT encoded image data using an inverse discrete wavelet transform (IDWT) to provide IDWT decoded image data, wherein the DWT is of the form:

$$U(x) = \frac{1}{\sqrt{2}}(idct(x) + idct(x+1))$$

$$idct(x) = f(x) = \frac{1}{\sqrt{2}}(U(x) + 0)$$

where $$idct(x) = \sqrt{\frac{2}{N}} \sum_{u=0}^{N-1} c(u)F(u) \cos\frac{(2x+1)}{2N}u\pi$$

and the calculation of the IDWT is performed in a single step.

2. The method of claim 1, wherein a set of coefficients (W1–W11) are used in applying the DWT and the IDWT to the image data, the set of coefficients (W1–W11) being defined as a set of hexadecimal numbers consisting of: 0x5a8279a, 0x539eba4, 0x22a2f4f, 0x73fbfbf, 0x28ba703, 0x1b36b93, 0x17121a5, 0x300ad29, 0x6253a61, 0x41b3287 and 0x098e634.

3. A method for encoding and decoding image data, the method comprising the steps of:

encoding image data using a discrete wavelet transform (DWT) to provide DWT encoded image data; and decoding the DWT encoded image data using an inverse discrete wavelet transform (IDWT) to provide IDWT decoded image data; and further including the steps of interpolating the DWT encoded data, and decoding the DWT encoded image data using the IDWT to provide interpolated IDWT image data, wherein the IDWT is defined as:

$$f(x) = \frac{1}{\sqrt{2}}(U(x) + V(x))$$

$$f(x+1) = \frac{1}{\sqrt{2}}(U(x) - V(x))$$

where $U(x) = \frac{1}{\sqrt{2}}(idct(x) + idct(x+1))$ and $$V(x) = \frac{1}{\sqrt{2}}(idct(x) - idct(x+1)).$$

* * * * *